(12) United States Patent
Otuka

(10) Patent No.: US 8,666,599 B2
(45) Date of Patent: Mar. 4, 2014

(54) DRIVING SUPPORT SYSTEM

(75) Inventor: Kazuyoshi Otuka, Yokohama (JP)

(73) Assignee: Honda elesys Co., Ltd., Yokohama (JP)

( * ) Notice: Subject to any disclaimer, the term of this patent is extended or adjusted under 35 U.S.C. 154(b) by 0 days.

(21) Appl. No.: 13/443,697

(22) Filed: Apr. 10, 2012

(65) Prior Publication Data

US 2012/0296522 A1 Nov. 22, 2012

(30) Foreign Application Priority Data

Apr. 14, 2011 (JP) .................................. 2011-090417

(51) Int. Cl.
*B62D 6/00* (2006.01)

(52) U.S. Cl.
USPC .......................................................... 701/41

(58) Field of Classification Search
USPC ............................................ 701/41; 348/148
See application file for complete search history.

(56) References Cited

U.S. PATENT DOCUMENTS 6,593,960 B1 * 7/2003 Sugimoto et al. ............. 348/148
7,634,339 B2 * 12/2009 Kudo ................................ 701/41
2007/0091173 A1 * 4/2007 Kade et al. ..................... 348/119
2008/0065328 A1 * 3/2008 Eidehall et al. ................ 701/301
2008/0186382 A1 * 8/2008 Tauchi et al. .................. 348/148

FOREIGN PATENT DOCUMENTS

JP 2009-29203 A 2/2009
JP 2009029203 A * 2/2009

* cited by examiner

*Primary Examiner* — Mary Cheung
*Assistant Examiner* — Anne Mazzara
(74) *Attorney, Agent, or Firm* — Arent Fox LLP

(57) ABSTRACT

A driving support system includes a first, a second, and a third imaging units capturing images of front view, right rear view, and left rear view from the vehicle, respectively, a turn signal indicator operation detection unit detecting an operation state of a turn signal indicator of the vehicle, a steering control unit controlling a steering operation of the vehicle, a lane keeping support unit performing driving support for lane keeping, and a lane change support unit performing a lane change by instructing the lane keeping support unit to cancel lane keeping based on the the image of the rear view from the vehicle when an operation of the turn signal indicator is detected, and withholding a lane change and wait until there is no obstructing vehicle and then cancelling withholding of the lane change when it is determined that there is no obstructing vehicle.

4 Claims, 4 Drawing Sheets

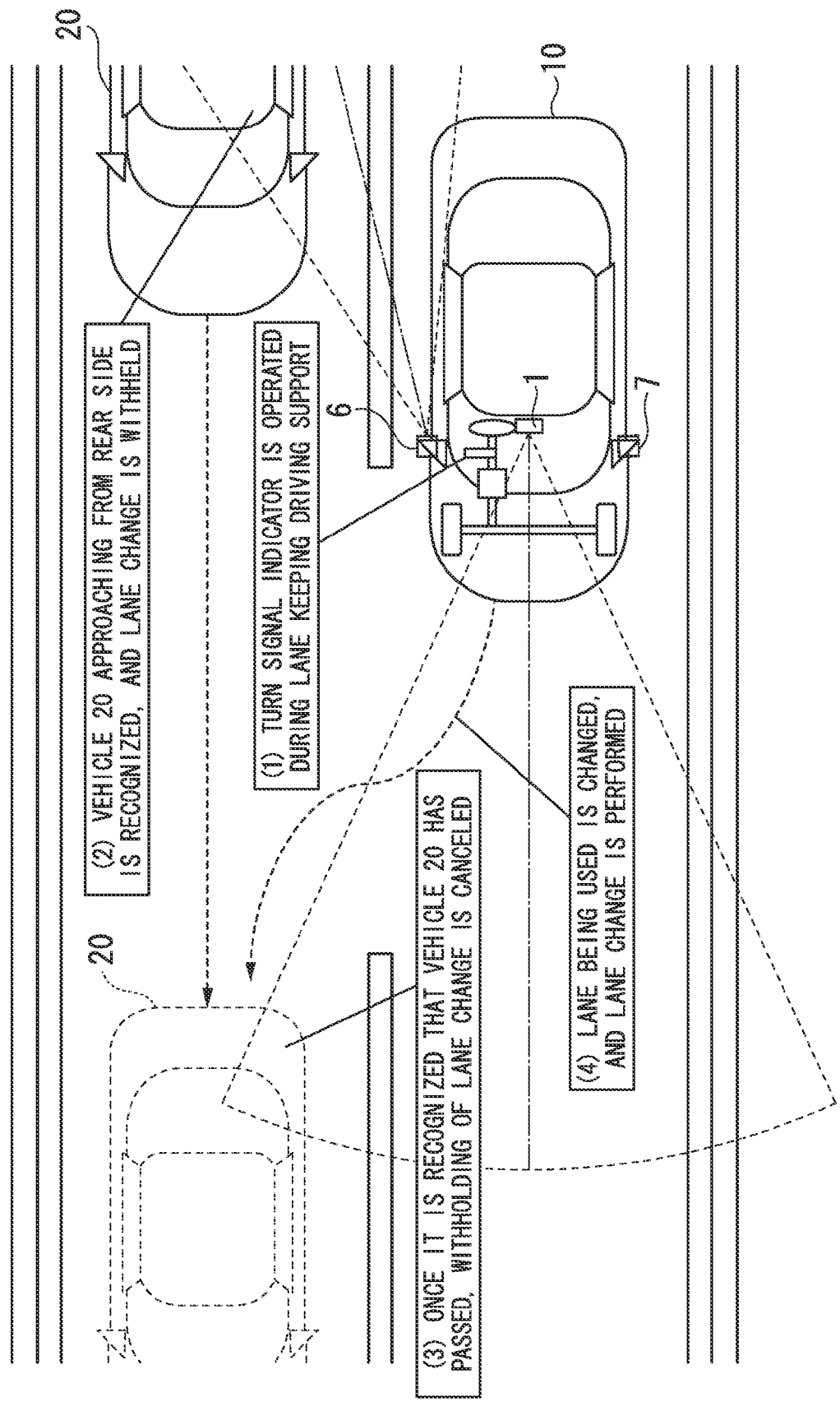

DRIVING SUPPORT SYSTEM

CROSS-REFERENCE TO RELATED APPLICATIONS

Priority is claimed on Japanese Patent Application No. 2011-90417, filed Apr. 14, 2011, the contents of which are entirely incorporated herein by reference.

BACKGROUND OF THE INVENTION

1. Field of the Invention

The present invention relates to a driving support system which supports a driving operation at the time of lane change or the like.

2. Background Art

Conventionally, a lane keeping driving support device is known which recognizes a lane based on the image of a front view from a vehicle captured by an on-board monitoring camera and supports driving, which maintains traveling in the lane, by associating with control of power steering. This lane keeping driving support device recognizes the markers, such as white lines and yellow lines indicating the lane separation on the road, using one on-board monitoring camera, calculates the amount of positional deviation of the vehicle from the middle of the lane, and performs driving support by controlling the power steering so that the positional deviation is eliminated.

On the other hand, in recent years, three-dimensional objects, especially preceding vehicles, guardrails, pylons, and the like can be recognized using an on-board camera, and application fields, such as obstacle avoidance, maintaining the distance between vehicles within the lane, and collision warning, have become widespread. For example, a driving support device is known which calculates the degree of difficulty changing lanes based on the presence of a following vehicle, the relative relationship with space of a lane change destination, and the like using a rear view monitoring camera or the like and outputs an alarm or the like according to the degree of difficulty (for example, refer to JP-A-2009-029203). Thus, driving support devices which utilize images captured by cameras have been increasing in recent years. Accordingly, in order to perform driving support in a state where not only cameras which monitor the front and the rear of a vehicle, but also cameras which monitor the blind spot of the front left and right or the blind spot of the rear left and right are mounted, a possibility that a plurality of cameras will be mounted in the vehicle is increasing.

SUMMARY OF THE INVENTION

However, the conventional driving support device is configured to have a camera mounted according to the purpose of driving support and to perform control for performing driving support based on an image from the camera, and each driving support device performs control for performing driving support depending on an image from a camera provided in order to achieve the purpose, even though a plurality of cameras are mounted. For this reason, for example, even if an obstacle is recognized by a front view monitoring camera, there is a problem in that appropriate avoidance behavior cannot be performed since the control of driving support for avoidance behavior to the adjacent parallel lane is not interlocked.

The present invention has been made in view of such a situation, and it is an object of the present invention to provide a driving support system capable of supporting an appropriate driving operation when performing driving support based on the images from a plurality of cameras.

A first aspect of the present invention is a driving support system including: a first imaging unit configured to capture an image of a front view from a vehicle; a second imaging unit configured to capture an image of a right rear view from the vehicle; a third imaging unit configured to capture an image of a left rear view from the vehicle; a turn signal indicator operation detection unit configured to detect an operation state of a turn signal indicator of the vehicle; a steering control unit configured to control a steering operation of the vehicle; a lane keeping support unit configured to recognize a lane, in which a host vehicle is to travel, from the image of the front view captured by the first imaging unit and performs driving support for lane keeping by controlling the steering operation using the steering control unit so that the vehicle travels while remaining in the lane; and a lane change support unit configured to search for a vehicle as an obstacle to a lane change from the the image of the rear view from the vehicle, which has been captured by the second or third imaging unit, corresponding to a direction detected by the turn signal indicator operation detection unit when an operation of the turn signal indicator is detected by the turn signal indicator operation detection unit during driving support for lane keeping, to perform a lane change by instructing the lane keeping support unit to change a lane being used to an adjacent lane in a direction detected by the turn signal indicator operation detection unit when it is determined that there is no obstructing vehicle, and to withhold a lane change and wait until there is no obstructing vehicle and then cancel withholding of the lane change when it is determined that there is no obstructing vehicle.

The driving support system described above may further include a speed detection unit configured to detect a speed of the vehicle, wherein a driving support operation of the lane change support unit is executed when the speed detected by the speed detection unit is greater than or equal to a predetermined speed.

The driving support system described above may further include an alarm output unit configured to output an alarm indicating that a lane change is not possible when a waiting time until there is no obstructing vehicle exceeds a predetermined time.

According to the present invention, when performing driving support based on the images captured by cameras which monitor the area around a vehicle, driving support for lane keeping using the imaged from the front view monitoring camera and driving support for lane change using the images from the left and right rear view monitoring cameras are made to cooperate with each other. Accordingly, when a turn signal indicator is operated during the lane keeping driving support, a lane change is performed after confirming whether or not there is an obstacle in the direction in which the turn signal indicator has been operated and also confirming whether or not there is space for the lane change. As a result, an effect that an appropriate driving operation can be supported is obtained.

BRIEF DESCRIPTION OF THE DRAWINGS

FIG. 4 is an explanatory view showing the operation of the lane change support unit shown in FIG. 1.

DETAILED DESCRIPTION OF THE INVENTION

Figure 1:
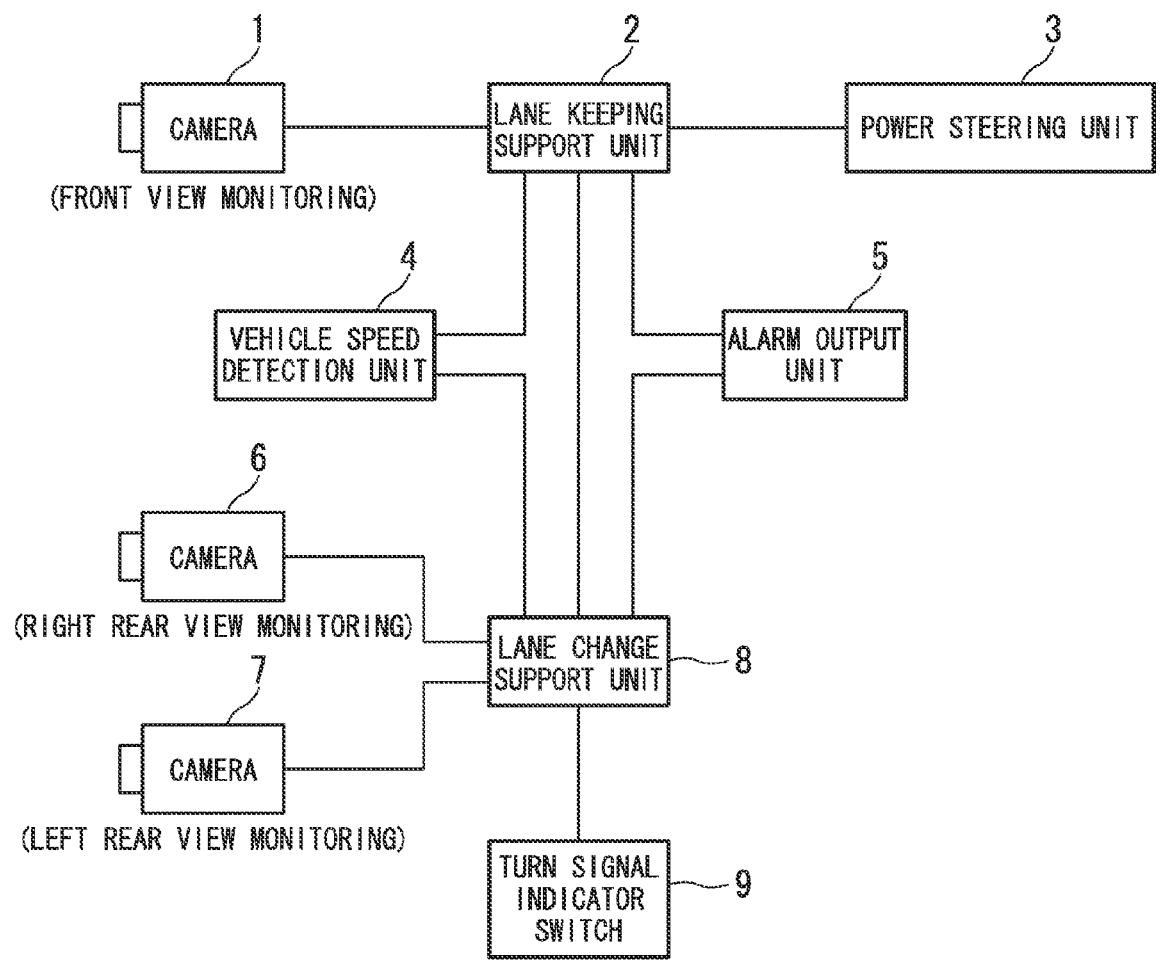
FIG. 1 is a block diagram showing the configuration of an embodiment of the present invention.

Hereinafter, a driving support system according to an embodiment of the present invention will be described with reference to the drawings. FIG. 1 is a block diagram showing the configuration of the same embodiment. In this drawing, reference numeral 1 denotes a camera (first imaging unit) which is mounted in a vehicle 10 (refer to FIG. 2) and which captures the image of a front view from the vehicle in order to monitor the front of the vehicle. Reference numeral 2 denotes a lane keeping support unit configured to recognize the white lines or the like, which separates the lanes, from the image of the front view from the vehicle captured by the camera 1 and performs driving support for lane keeping by performing control such that the vehicle travels while keeping the lane. Reference numeral 3 denotes a power steering unit configured to control a steering operation by an electric power steering based on the control instruction information output from the lane keeping support unit 2 (steering control unit). Reference numeral 4 denotes a vehicle speed detection unit configured to detect the speed of the vehicle. Reference numeral 5 denotes an alarm output unit configured to issue an alarm to a driver using a voice or the like.

Reference numeral 6 denotes a camera (second imaging unit) which is mounted in the vehicle 10 and which captures an image of the right rear view from the vehicle in order to monitor the right rear view from the vehicle. Reference numeral 7 denotes a camera (third imaging unit) which is mounted in the vehicle 10 and which captures an image of the left rear view from the vehicle in order to monitor the left rear view from the vehicle. Reference numeral 8 denotes a lane change support unit configured to recognize other vehicles or the like behind the vehicle from the images captured by the two cameras 6 and 7, and performs driving support so that changing lanes can be performed safely. Reference numeral 9 denotes a turn signal indicator switch (turn signal indicator operation detection unit), and is used here in order to detect whether or not a lane change is desired.

Figure 2:
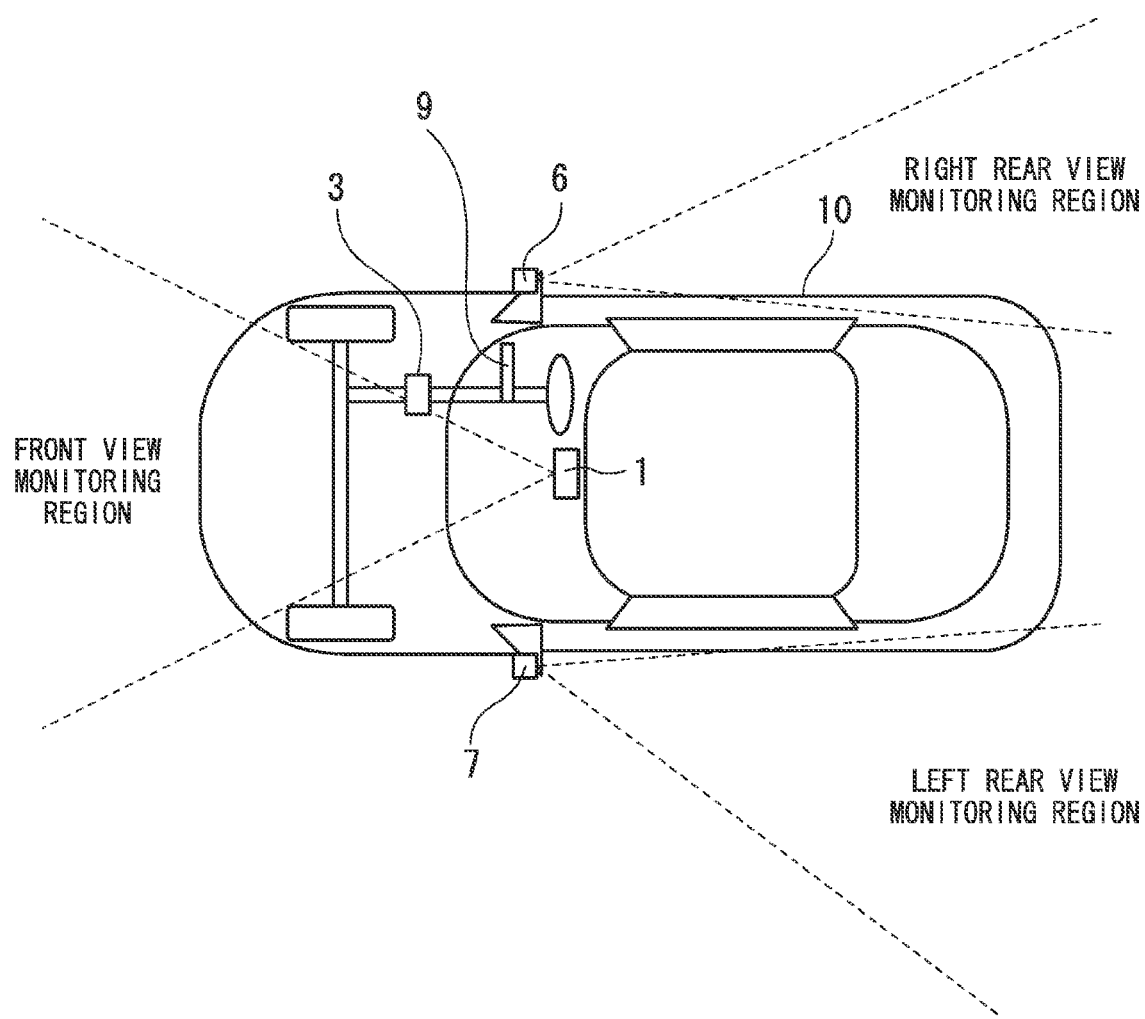
FIG. 2 is an explanatory view showing the arrangement position of each device shown in FIG. 1.

Next, the mounting positions of the three cameras 1, 6, and 7 shown in FIG. 1 and the monitoring region of each camera will be described with reference to FIG. 2. The camera 1 which monitors the front view from the vehicle 10 is provided in a vehicle, and has an imaging field of view in which at least white lines of the lane, in which the host vehicle is traveling, can be captured. The front view monitoring region of the camera 1 is determined by the imaging field of view of the camera 1. In addition, the camera 6 which monitors the right rear of the vehicle 10 is provided at the right side mirror or the like, and has an imaging field of view in which following vehicles traveling along the lane adjacent to the right side of the lane, in which the host vehicle is traveling, can be captured. The camera 7 which monitors the left rear of the vehicle 10 is provided at the left side mirror or the like, and has an imaging field of view in which following vehicles traveling along the lane adjacent to the left side of the lane, in which the host vehicle is traveling, can be captured. The rear view monitoring regions of the left and right sides of the cameras 6 and 7 are determined by the imaging fields of view of the cameras 6 and 7, respectively.

Next, an operation of the driving support system shown in FIG. 1 will be described. First, an operation to perform driving support for lane keeping will be described. When the vehicle speed detected by the vehicle speed detection unit 4 is greater than or equal to the predetermined speed, the lane keeping support unit 2 recognizes the markers, such as white lines and yellow lines indicating the lane separation on the road, from an image captured by the camera 1, calculates the amount of positional deviation from the middle of the lane in which the host vehicle should travel, and performs driving support by controlling the power steering unit 3 so as to eliminate this amount of positional deviation. In this case, when the lane keeping support unit 2 detects that the vehicle is likely to deviate from the lane, the lane keeping support unit 2 instructs the alarm output unit 5 to output an alarm. The lane keeping support unit 2 continues the driving support operation of lane keeping by repeatedly executing this processing operation until the vehicle speed becomes lower than the predetermined speed or the driver stops the lane keeping function.

Figure 3:
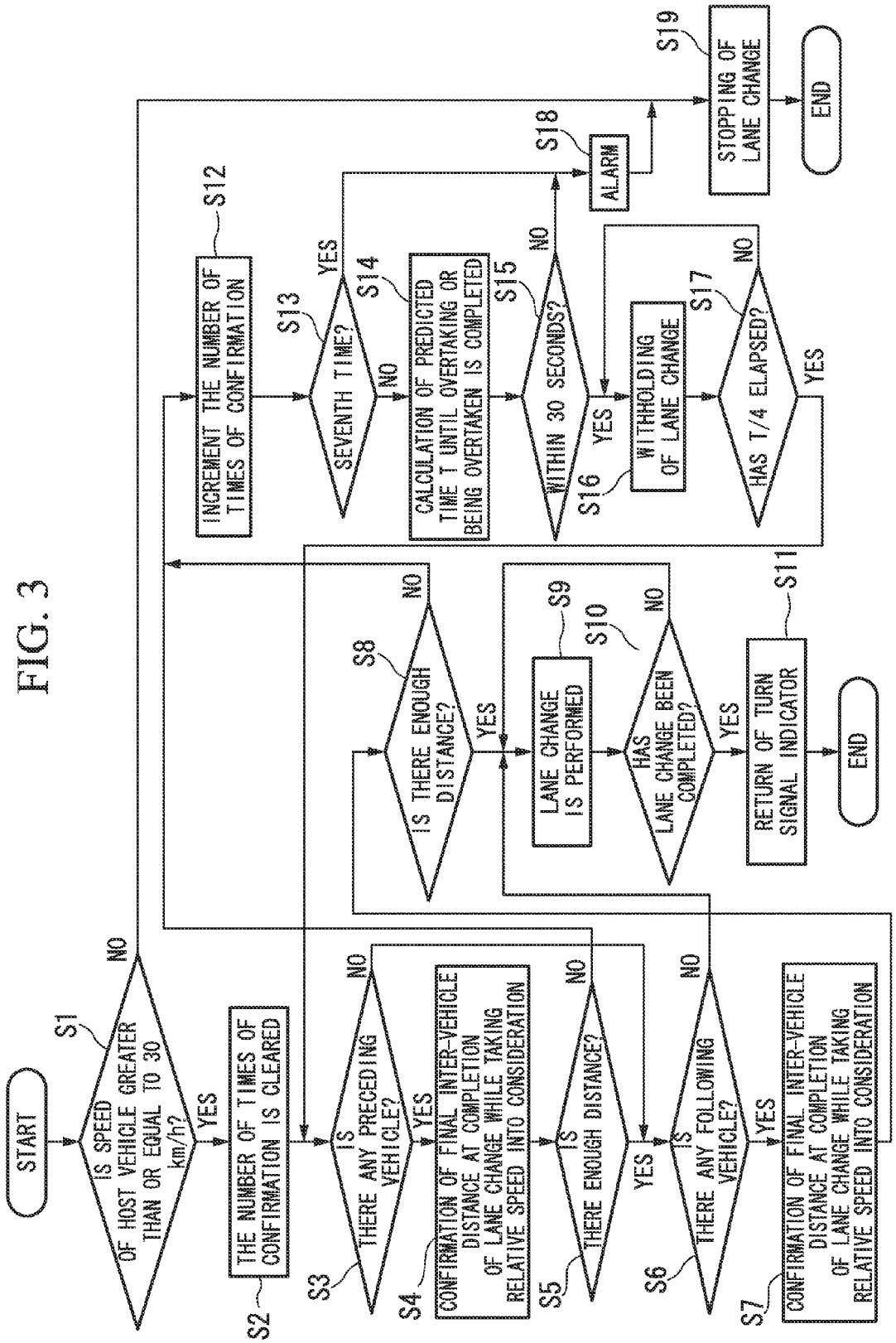
FIG. 3 is a flowchart showing the operation of a lane change support unit shown in FIG. 1.

Next, an operation to perform driving support for a lane change during the lane keeping driving support will be described with reference to FIG. 3. The lane change support unit 8 starts lane change driving support processing when the operation of the turn signal indicator switch 9 is detected. When the lane change driving support processing starts, the lane change support unit 8 reads the vehicle speed value output from the vehicle speed detection unit 4 and determines whether the vehicle speed is greater than or equal to 30 km/h (step S1). If the vehicle speed is not greater than or equal to 30 km/h as a result of this determination, it is regarded as left or right turn, the lane change driving support processing is stopped (step S19), and the process is terminated.

On the other hand, if the vehicle speed is greater than or equal to 30 km/h, the lane change support unit 8 clears the number of times of confirmation stored therein (step S2), and asks the lane keeping support unit 2 about whether or not there is a preceding vehicle. In response to this, the lane keeping support unit 2 outputs the information regarding a preceding vehicle (information regarding whether or not there is a preceding vehicle, and relative speed information when there is a preceding vehicle), which is detected during the driving support processing of lane keeping, to the lane change support unit 8. Based on this information, the lane change support unit 8 determines whether or not there is a preceding vehicle (step S3). When there is a preceding vehicle as a result of this determination, the lane change support unit 8 confirms the inter-vehicle distance until the lane change is completed taking the relative speed into consideration (step S4), and determines whether or not there is enough distance (step S5). When there is no preceding vehicle, steps S3 and S4 are skipped.

When there is enough distance, the lane change support unit 8 determines whether or not there is a following vehicle from an image from the camera (here, the camera 6 or the camera 7) provided in a direction (left or right) in which the turn signal indicator switch 9 has been operated (step S6). When there is a following vehicle as a result of this determination, the lane change support unit 8 confirms the inter-vehicle distance until the lane change is completed taking the relative speed into consideration (step S7). Then, the lane change support unit 8 determines whether or not there is enough distance (step S8), and performs a lane change when there is enough distance (step S9). In step S6, the lane change support unit 8 performs a lane change even when there is no following vehicle. A lane change is performed by giving the lane keeping support unit 2 an instruction to change lanes to the adjacent lane in the direction in which the turn signal indicator switch 9 has been operated. The lane keeping support unit 2 makes the changes of the lane to be used, and outputs the completion of a lane change to the lane change support unit 8 when the lane change is completed. The lane change support unit 8 waits until the lane change is completed (step S10). When the completion of the lane change is output from the lane keeping support unit 2, the turn signal indicator switch 9 is returned (step S11), and the process ends.

On the other hand, when there is not enough distance in step S5, the lane change support unit 8 increments the number of times of confirmation stored therein (step S12), and determines whether or not the number of times of confirmation has reached 7 (step S13). Although the determination value of the number of times of confirmation is set to 7 herein, the determination value may be arbitrarily set. If the number of times of confirmation has reached 7 as a result of this determination, the lane change support unit 8 calculates the predicted time T until overtaking or being overtaken is completed (step S14). The predicted time T is calculated from the distance from the host vehicle and the relative speed. Then, the lane change support unit 8 determines whether or not the predicted time T is less than or equal to 30 seconds (step S15). If the predicted time T is not less than or equal to 30 seconds as a result of this determination, the lane change support unit 8 issues an alarm from the alarm output unit 5 (step S18). In addition, the lane change support unit 8 also issues an alarm when the number of times of confirmation has reached 7.

Then, when the predicted time T is less than or equal to 30 seconds, the lane change support unit 8 withholds a lane change (step S16), and determines whether or not time of T/4 has elapsed (step S17). If T/4 has not elapsed, the lane change support unit 8 continues the withholding of the lane change. Then, when T/4 has elapsed, the process returns to step S3 to determine again whether or not there is a preceding vehicle and repeat the processing.

Next, with reference to FIG. 4, an operation of the lane change will be described by way of a specific example. First, when a turn signal indicator is operated during the lane keeping driving support and the driver indicates his/her intention of changing lanes (refer to reference numeral (1) in FIG. 4), it is checked whether or not there is an obstructing vehicle or the like in the lane change direction using the front view monitoring camera 1 and the right rear view monitoring camera 6 or the left rear view monitoring camera 7.

Then, when it is determined that there is no vehicle approaching from the rear side and there is no obstructing vehicle ahead in the lane change direction, a lane change is allowed, and the lane being used is changed from the lane in which the vehicle is traveling at that point of time to the adjacent lane in the lane change direction. After the lane change is performed, the lane keeping is continued. When the vehicle 10 has entered into the new lane to be used, and the lane keeping driving support is continuously established, the turn signal indicator is returned, and notification that the lane change has been completed successfully is delivered to the driver.

On the other hand, when a vehicle 20 approaching from the rear side is recognized, a lane change is withheld (refer to reference numeral (2) in FIG. 4). Once it is recognized that the vehicle 20 has passed, the withholding of the lane change is canceled (refer to reference numeral (3) in FIG. 4). Then, the lane being used is changed, and a lane change is performed (refer to reference numeral (4) of FIG. 4).

In addition, the determination criteria of whether or not to perform a lane change are as follows. That is, the final inter-vehicle distance at the completion of the lane change support, which is performed while maintaining the speed at that point of time, is predicted, and space allowing a lane change is determined according to the predicted distance. The threshold value for determination changes according to the speed of the host vehicle. For example, the threshold value for determination is set to 50 m at 100 km/h and 25 m at 50 km/h. In addition, even when it is determined that there is no preceding vehicle and no following vehicle, determination reliability is acquired from recognition processing, and it is confirmed whether or not the determination result is sufficiently reliable. In addition, the driver's intention of stopping or making left or right turn is predicted based on the speed of the host vehicle, and the lane change support is stopped if the speed is smaller than or equal to the minimum speed (30 km/h). Moreover, since the brake operation itself can also be considered as a mere speed adjustment, stop determination based on a brake signal is not performed. Overtaking or being overtaken is determined by distance and relative speed. When the predicted time of overtaking/being overtaken is greater than or equal to a fixed value (for example, 30 seconds) or when there is no space even after 1.5 times the predicted time has elapsed, lane change support is stopped and an alarm is issued.

As described above, when performing driving support from images from cameras which monitor the area around a vehicle, driving support for lane keeping using an image from the front view monitoring camera and driving support for lane change using images from the left and right rear view monitoring cameras are made to cooperate with each other. Accordingly, when a turn signal indicator switch is operated during the lane keeping driving support, a lane change is performed after confirming whether or not there is an obstacle in the direction in which the turn signal indicator switch has been operated and also confirming whether or not there is space for the lane change. As a result, it is possible to realize appropriate driving support.

Moreover, an image production processing may be performed by recording a program for performing the control functions of the processing units shown in FIG. 1 in a computer-readable recording medium and by causing a computer system to read and execute the program recorded in the recording medium. Here, the "computer system" includes an OS or hardware such as peripherals. Examples of the "computer-readable recording medium" include portable mediums such as a flexible disk, a magneto-optical disc, a ROM, and a CD-ROM, and memory devices, such as a hard disk, built in the computer system. Furthermore, the "computer-readable recording medium" may include a recording medium dynamically storing a program for a short time like a transmission medium when the program is transmitted via a network such as the Internet or a communication line such as a phone line and a recording medium storing a program for a predetermined time like a volatile memory (RAM) in a computer system serving as a server or a client in that case.

The programs may be transmitted from a computer system having the programs stored in a storage device thereof or the like to another computer system through a transmission medium or by carrier waves in the transmission medium. The "transmission medium" which transmits a program means a medium having a function of transmitting information and examples thereof include a network (communication network) such as the Internet and a communication link (communication line) such as a telephone line. The program may realize some of the above-described functions. The program may realize the above-described functions in combination with a program already recorded in a computer system, that is, the program may be a differential file (differential program).

The present invention is applicable to a use in which support of driving operations, such as a lane change operation based on the images captured by a camera, is required.

What is claimed is:

1. A driving support system comprising:
a first imaging unit configured to capture an image of a front view from a vehicle;
a second imaging unit configured to capture an image of a right rear view from the vehicle;
a third imaging unit configured to capture an image of a left rear view from the vehicle;
a turn signal indicator operation detection unit configured to detect an operation state of a turn signal indicator of the vehicle;
a steering control unit configured to control a steering operation of the vehicle;
a lane keeping support unit configured to recognize a lane, in which a host vehicle is to travel, from the image of the front view captured by the first imaging unit and performs driving support for lane keeping by controlling the steering operation using the steering control unit so that the vehicle travels while remaining in the lane; and
a lane change support unit configured to search for a vehicle as an obstacle to a lane change from the image of the rear view from the vehicle, which has been captured by the second or third imaging unit, corresponding to a direction detected by the turn signal indicator operation detection unit when an operation of the turn signal indicator is detected by the turn signal indicator operation detection unit during driving support for lane keeping, to perform a lane change by instructing the lane keeping support unit to change a lane being used to an adjacent lane in a direction detected by the turn signal indicator operation detection unit when it is determined that there is no obstructing vehicle, and to withhold a lane change and wait until there is no obstructing vehicle and then cancel withholding of the lane change when it is determined that there is no obstructing vehicle.

2. The driving support system according to claim 1, further comprising:
a speed detection unit configured to detect a speed of the vehicle,
wherein a driving support operation of the lane change support unit is executed when the speed detected by the speed detection unit is greater than or equal to a predetermined speed.

3. The driving support system according to claim 2, further comprising:
an alarm output unit configured to output an alarm indicating that a lane change is not possible when a waiting time until there is no obstructing vehicle exceeds a predetermined time.

4. The driving support system according to claim 1, further comprising:
an alarm output unit configured to output an alarm indicating that a lane change is not possible when a waiting time until there is no obstructing vehicle exceeds a predetermined time.

* * * * *